No. 647,796. Patented Apr. 17, 1900.
W. E. BILLINGTON.
DRAFT EQUALIZER.
(Application filed Dec. 14, 1899.)
(No Model.)
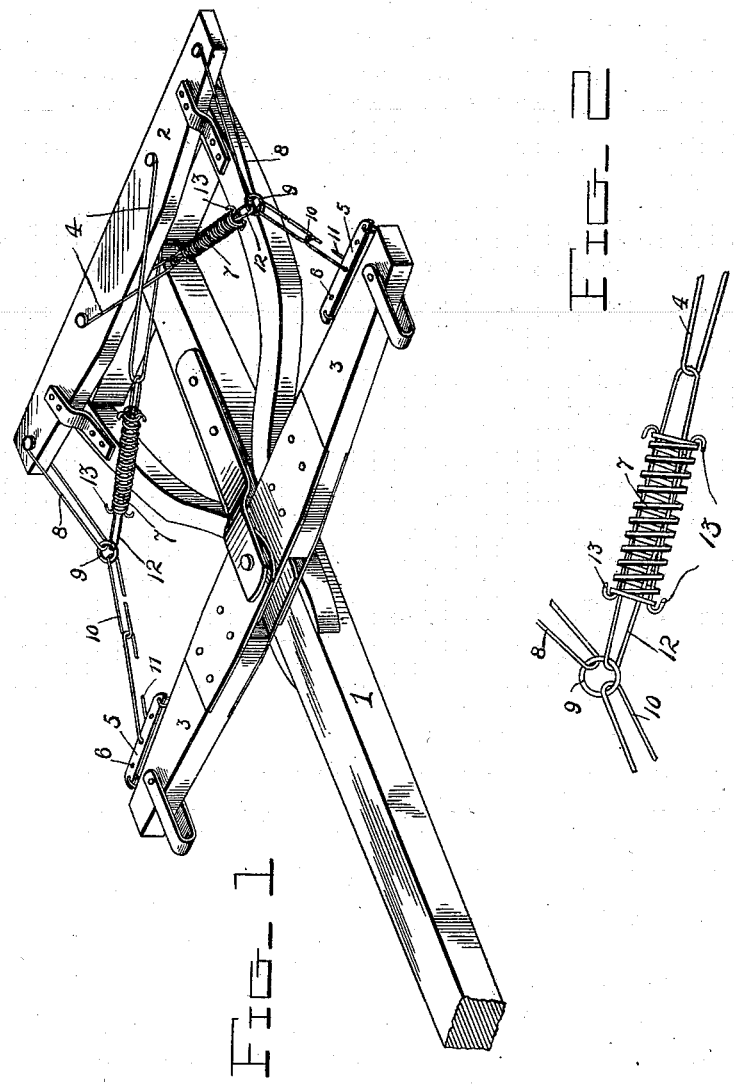
Inventor
W. E. Billington

United States Patent Office.

WESLEY E. BILLINGTON, OF FARMERSVILLE, TEXAS.

DRAFT-EQUALIZER.

SPECIFICATION forming part of Letters Patent No. 647,796, dated April 17, 1900.

Application filed December 14, 1899. Serial No. 740,352. (No model.)

*To all whom it may concern:*

Be it known that I, WESLEY E. BILLINGTON, a citizen of the United States, residing at Farmersville, in the county of Collin and State of Texas, have invented certain new and useful Improvements in Draft-Equalizers; and I do declare the following to be a full, clear, and exact description of the invention, such as will enable others skilled in the art to which it appertains to make and use the same.

The invention relates to draft-equalizers.

The object of the invention is to provide a simple, durable, and inexpensive draft-equalizer which shall be efficient in operation.

With this object in view the invention consists in certain features of construction and combination of parts, which will be hereinafter set forth.

Figure 1 is a perspective view of my improved draft-equalizer, and Fig. 2 is a detail perspective view of the springs and links therein disclosed.

The operation of the device will be readily understood. The draft upon one of the levers 3 will be communicated to both ends of the cross-head 2 through the intermediate spring connections. The springs serve to relieve the vehicle of the jar in the starting up of the animal and also to relieve the animal of any unnecessary strain. The tension of these springs may be adjusted by moving the forward end links of the chain 10 in the apertures 6 of the parallel bars 5.

1 denotes the pole of the vehicle, and 2 the cross-head, fixed at the rear end thereof.

3 denotes two draft-levers, the inner ends of which are pivoted together and pivoted to the pole.

4 denotes bails which cross each other and have their rear ends pivoted to the cross-piece.

5 denotes bars secured to the rear edge of each pivoted lever near its outer end and extending longitudinally of the lever and provided with a longitudinal row of apertures 6.

7 denotes coil-springs, and 8 denotes loops pivoted to the outer end of the cross-piece and connected to rings 9, carried by a chain 10, the fore end of which is provided with a hook 11 to engage the apertures of the bars at the outer ends of the draft-levers.

Extending through each coil-spring are two bails 12, each of which is provided with hooked ends 13 to embrace the ends of the coil-springs. One bail of each set is connected to the rings before referred to and the other bail is connected to the loops or bails 4.

From the foregoing description, taken in connection with the accompanying drawings, the construction and advantages of the invention will be readily understood without requiring an extended explanation, and it will of course be understood that various changes in the form, proportion, and the minor details of construction may be resorted to without departing from the principle or sacrificing any of the advantages of this invention.

What I claim is—

The combination with a pole, of a cross-piece secured to the rear end thereof, pivoted draft-levers, bails secured to said cross-piece, perforated bars secured to the rear edge of the pivoted levers and provided with rows of apertures, coil-springs, bails inserted through said coil-springs and having two hooked ends to engage the ends of the coil-springs; said ends being connected to the first-named bails and connected between said bails and the perforated bars, substantially as set forth.

In testimony whereof I have hereunto set my hand in presence of two subscribing witnesses.

WESLEY E. BILLINGTON.

Witnesses:
L. L. MILLER,
J. COHEN.